United States Patent
Schoenbeck

(10) Patent No.: US 8,813,622 B2
(45) Date of Patent: Aug. 26, 2014

(54) MACHINE FOR SLITTING METAL SHEET

(75) Inventor: Dean S. Schoenbeck, Red Bud, IL (US)

(73) Assignee: Red Bud Industries, Inc., Red Bud, IL (US)

(*) Notice: Subject to any disclaimer, the term of this patent is extended or adjusted under 35 U.S.C. 154(b) by 219 days.

(21) Appl. No.: 13/370,414

(22) Filed: Feb. 10, 2012

(65) Prior Publication Data

US 2013/0205966 A1 Aug. 15, 2013

(51) Int. Cl.
*B26D 7/26* (2006.01)
*B26D 1/18* (2006.01)

(52) U.S. Cl.
USPC .............. 83/425.4; 83/53; 83/495; 83/498; 83/177

(58) Field of Classification Search
USPC ........... 83/479, 482, 483, 484, 491, 495, 498, 83/499, 504, 425, 425.2, 425.3, 425.4, 83/655, 659, 508.2, 508.3, 169, 171, 53, 83/177; 138/106
See application file for complete search history.

(56) References Cited

U.S. PATENT DOCUMENTS

| | | | | |
|---|---|---|---|---|
| 325,673 A | * | 9/1885 | Guss | 83/169 |
| 1,036,173 A | * | 8/1912 | Arey | 83/169 |
| 2,652,892 A | * | 9/1953 | Domke | 83/482 |
| 2,897,893 A | * | 8/1959 | Rockstrom et al. | 83/482 |
| 3,055,247 A | * | 9/1962 | Goble | 83/425 |
| 3,877,335 A | * | 4/1975 | Lange | 83/501 |
| 4,807,361 A | * | 2/1989 | Raczkowski | 30/123.3 |
| 4,831,909 A | * | 5/1989 | Peters et al. | 83/425.4 |
| 4,887,502 A | | 12/1989 | Voges | |
| 5,090,281 A | * | 2/1992 | Paulson et al. | 83/13 |
| 6,857,350 B1 | | 2/2005 | Liefer et al. | |
| 7,134,372 B2 | * | 11/2006 | Flaherty et al. | 83/425.4 |

* cited by examiner

*Primary Examiner* — Kenneth E. Peterson
*Assistant Examiner* — Jennifer Swinney
(74) *Attorney, Agent, or Firm* — Polster Lieder Woodruff & Lucchesi, L.C.

(57) ABSTRACT

A machine for slitting metal sheet into strips includes a fixed upper beam and a lower beam that is displaceable vertically. Both beams support slitter heads that move along the beams. Each beam carries an arbor that rotates in it and extends through the slitter heads on it. Each beam also has a fixed threaded shaft and lock rods that extend through the slitter heads on it. Each slitter head carries a knife that rotates with the arbor for its beam. Each slitter head also has a motor-driven nut that engages the threaded shaft extending through the beam and, when rotated, moves the slitter head along its beam. The slitter heads have clamps, which clamp down on the lock rods to secure the slitter heads in fixed positions. The knives rotate about axes that are skewed slightly relative to the axes of the arbors that drive them.

18 Claims, 13 Drawing Sheets

MACHINE FOR SLITTING METAL SHEET

CROSS-REFERENCE TO RELATED APPLICATIONS

Not applicable.

BACKGROUND OF THE INVENTION

This invention relates in general to machines for slitting sheet metal and, more particularly, a slitting machine having knives that are positioned quickly and with considerable precision, to a machine that affords easy and quick access to the knives, and to a machine in which the knives minimize distortions at the slits formed by the machine.

Steel mills furnish steel sheet in coils which rarely correspond in width to any of the multitude of products that are produced from the sheet. To facilitate the manufacture of such products, the steel sheet of a coil is withdrawn from the coil and slit longitudinally to widths suitable for the products. Often the sides are trimmed to provide undistorted side edges, and this produces more strips, although quite narrow. Slitting machines exist to slit the metal sheet. Metal strips derived from a slitting machine are then passed through a shear where they are cut into segments of appropriate length or else they are rewound into coils for subsequent processing or use.

The typical slitting machine has a frame in which upper and lower arbors rotate. The arbors carry knives, which in essence are disks having cylindrical peripheral surfaces that approach each other at a nip, yet are offset axially so that the side face of the upper disk lies slightly beyond the opposite side face of the lower disk. Moreover, at the nip the spacing between the cylindrical peripheral surfaces of the offset knives is less than the thickness of the sheet. Thus, as the steel sheet passes into and through the nip formed by a pair of knives, it undergoes a fracture which creates the slit.

The knives need to be positioned on their respective arbors with a good measure of precision, not only to ensure that the metal strips emerging from the machine have the correct width, but also to ensure that clean fractures occur within the sheet. A packed arbor utilizes spacers and shims to position the knives on it. Sometimes a computer selects the spacers and shims, but even so, setting up two packed arbors can consume considerable time. Moreover, tolerance build-up in the numerous spacers and shims can produce inaccurate dimensions in the strips. And of course the possibility of operator error exists. A programmable or semi-automatic slitter, such as disclosed in U.S. Pat. No. 4,887,502, uses a single movable stop along each arbor to position the knives for that arbor in the correct position on it. Each knife is moved against the stop and then secured on its arbor, whereupon the stop moves to the position for the next knife. In short, the knives are positioned one at a time. Even though a computer may control the movement and positioning of the stops, set up still requires time in which the slitting machine might otherwise be operating. This set up is also, to a measure, subject to operator skills.

The knives, which are essentially disks with narrow cylindrical surfaces defining their peripheries, from time to time require sharpening. This necessitates removing the knives from their respective arbors. Typically, the bearings that support the arbors at one end of the machine are backed away from the ends of the arbors and the knives are withdrawn axially from the arbors. This requires removing hubs that support the knives on the arbors and perhaps related appliances, such as stripper fingers that prevent the cut strips from acquiring curvature.

In this regard, as a cut strip emerges from the nip between the upper and lower knives of any pair, the upper knife deflects the cut strip against which it bears downwardly, so that it tends to follow the curvature of the lower knife, while the lower knife deflects the cut strip against which it bears upwardly so that it tends to follow the curvature of the upper knife. Hence, knives are organized such that along any cut strip, the knives that produce it correspond so as to deflect the strip at its sides in the same direction. While stripper fingers may exist along the sides of the knives to prevent the knives from deflecting the cut strips excessively, the strips still deflect. Indeed, each knife carries the edge of the strip along with it through a slight arc immediately after the nip at which the cut is made, and then the strip snaps back into a more planar orientation under the force exerted by the stripper finger along it and the pull of the segment of strip ahead of it. This may leave the strip with a rippled and burred edge.

Apart from that, the metal sheet upon being slit by a pair of knives tends to urge the knives apart axially. The means by which the knives are supported along their respective arbors in many slitting machines do not have the capacity to adequately resist the separating force, and as a consequence the knives deflect out of the positions best suited for slitting. Under such circumstances the cut formed by the knives may become somewhat jagged or burred.

DESCRIPTION OF THE INVENTION

Figure 1:
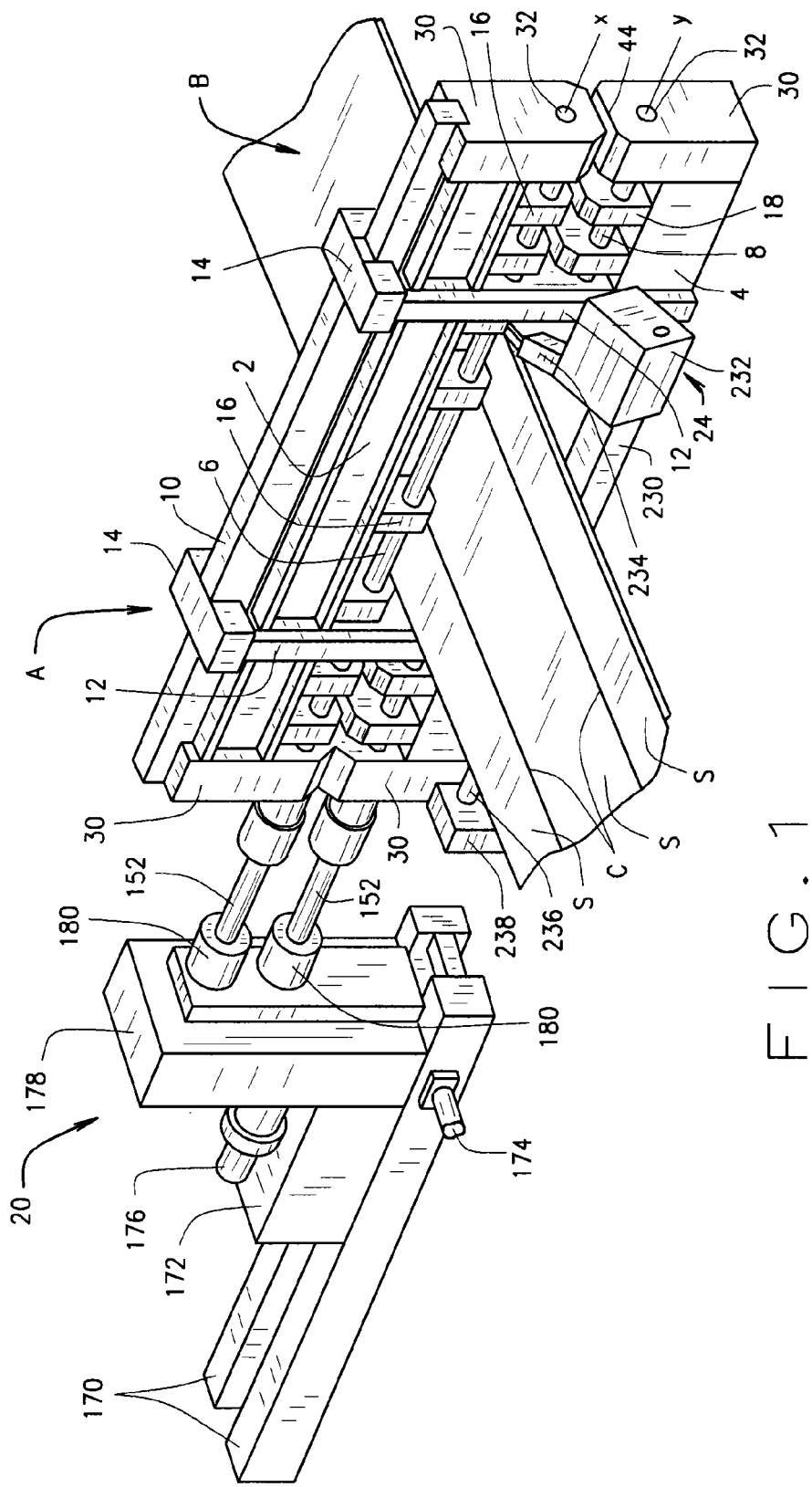
FIG. 1 is a perspective view of a slitting machine constructed in accordance with and embodying the present invention and showing a metal sheet being slit by the machine.

Referring now to the drawings, a slitting machine A (FIG. 1) cuts an extended metal sheet B into multiple strips S along slits C. Typically, the metal sheet B is sheet steel that can range from 0.015 in. to 0.25 in. in thickness. Often the two outermost strips S are quite narrow and are discarded as scrap so that any imperfections along the side edges of the metal sheet B are eliminated. Thus, the several remaining strips S emerging from the slitting machine A have clean and unblemished side edges.

Figure 10:
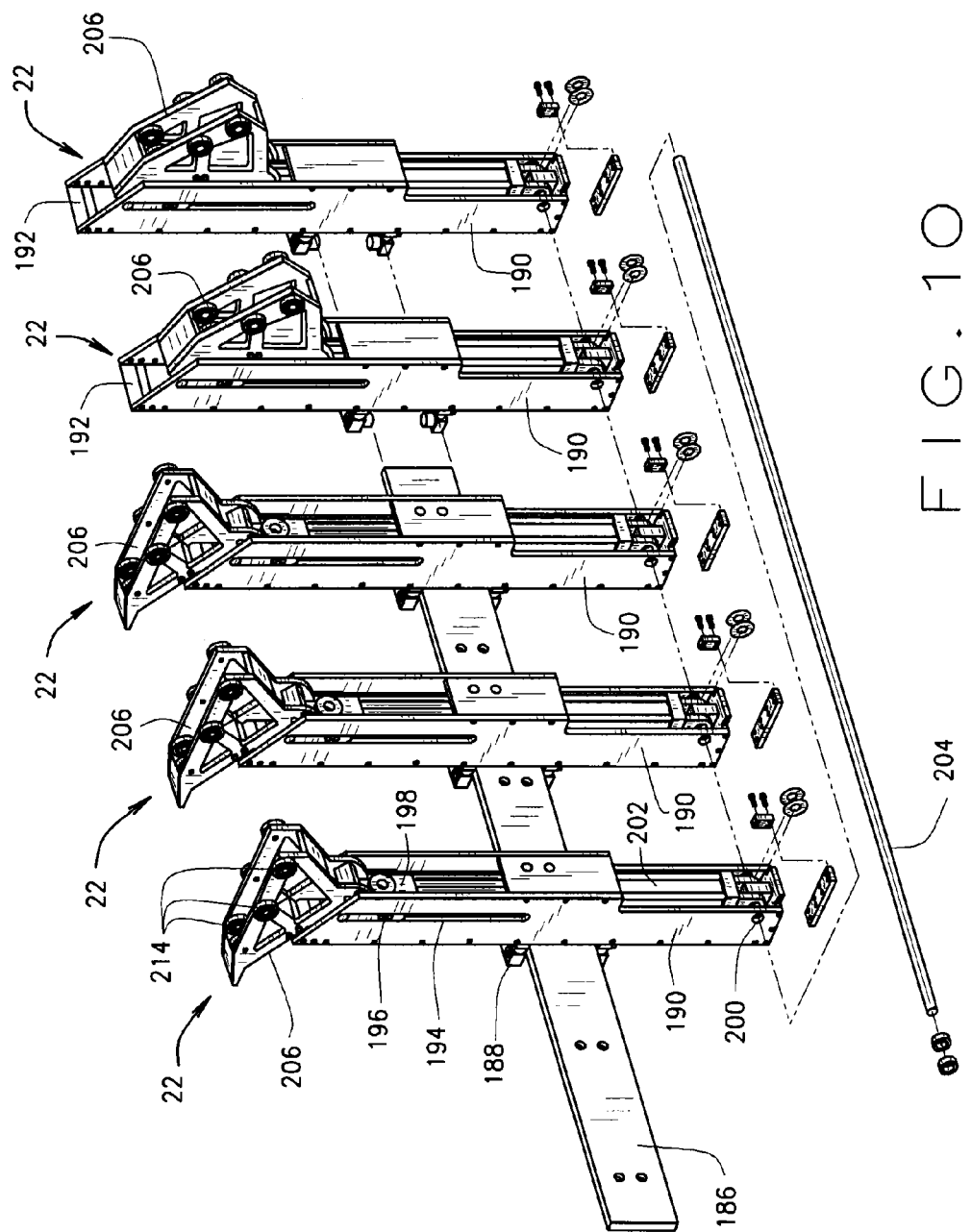
FIG. 10 is a perspective view of several exit supports on the exit side of the machine, some having their support shoes in an elevated position and some having their support shoes in a retracted position.
Figure 12:
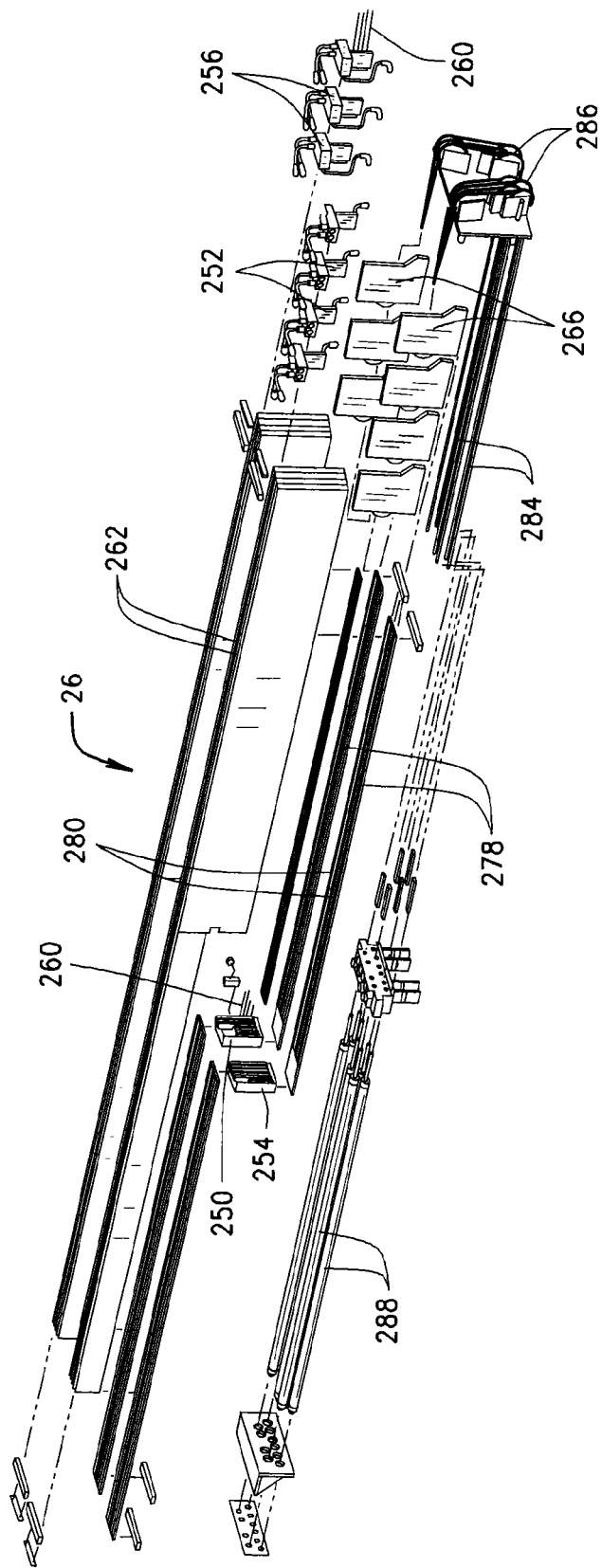
FIG. 12 is an exploded perspective view of the lower hose assembly for the machine.

The machine A basically includes (FIGS. 1-3) a fixed upper beam 2, a lower beam 4 that is displaceable upwardly and downwardly with respect to the upper beam 2, an upper arbor 6 that rotates in the upper beam 2 about an upper axis x, and a lower arbor 8 that rotates in the lower beam 4 about a lower axis y that always remains parallel to the upper axis x. Actually, the upper beam 2 forms part of a rigid bridge-type frame 10 that also includes several uprights 12 that attach to the upper beam 2 on both sides of the beam 2, yet are set inwardly from the ends of the beam 2, and also cross members 14 (FIGS. 2 & 5) that extend between the uprights 12 at the upper and lower ends of those uprights 12. In addition, the machine A has upper slitter heads 16 that are supported on the upper beam 2 and move along the upper arbor 6 and lower slitter heads 18 that are supported on the lower beam 4 and move along the lower arbor 8. The machine A also has a drive unit 20 (FIG. 1) that is located beyond one end of the frame 10 where it is coupled to the arbors 6 and 8 to rotate them and to also partially withdraw them from the frame 10. Further, the machine A has exit supports 22 (FIGS. 2 & 10) and scrap choppers 24 (FIG. 1) that are mounted where the slit strips S emerge from the machine A. The exit supports 22 provide underlying support for the strips S, while the scrap choppers 24 receive the narrow strips S that are cut from the sides of the sheet B and reduce those narrow strips S to fragments. Finally, the machine A has hose assemblies 26 (FIG. 12) that lead from the beams 2 and 4 to the slitter heads 16 and 18. Each of the arbors 6 and 8 has a keyway 28 (FIG. 4) that extends essentially its full length.

The uprights 12 on the frame 10 divide the machine into an active region, where slitter heads 16 and 18 slit the metal sheet B, and two storage regions, where the slitter heads 16 and 18 that are not required for slitting in a particular set-up are stored. In this regard, the uprights 12 are arranged in pairs (FIG. 2), there being one pair at the side of the active region closest to the drive unit 20 and the other pair at the side of the active region that is remote from the drive unit 20. Thus, one storage region exists adjacent to the drive unit 20, while the other exists at the opposite ends of the beams 2 and 4.

Turning now to the upper beam 2 (FIGS. 3-5), the uprights 12 support it in a fixed position above a supporting surface such as a floor or foundation. It has three aligned segments, one for each of the storage regions and another for the active region. In cross section the beam 2 resembles an inverted channel. It extends beyond the uprights 12 and at each end is fitted with an end member 30 containing a bearing 32. The two bearings 32 align and support the upper arbor 6, so that arbor 6 can rotate in the beam 2 about the axis x with minimal friction. Between the two bearings 32, the arbor 6 extends through the several upper slitter heads 16 on the beam 2, except when the arbor 6 is withdrawn through the bearings 32 to clear the storage area that is remote from the drive unit 20. This enables the slitter heads 16 that are within that area to be serviced. The upper beam 2 carries several rails or ways 34 (FIG. 4) that lie parallel to the upper arbor axis x and support the several upper slitter heads 16, enabling them to move along the beam 2. Also, the upper beam 2 contains a threaded shaft 36 (FIGS. 4 & 5) that extends the full length of the beam 2 parallel to the axis x and is secured at its ends in the end members 30 such that it can neither rotate nor displace axially. Finally, the upper beam 2 contains three lock elements or rods 38 that likewise extend the length of the beam 2 parallel to the axis x and are anchored at their ends in the end members 30 so that they likewise cannot displace axially. Both the threaded shaft 36 and the lock rods 38 extend through each of the upper slitter heads 16, with two of the rods 38 being at the sides of the upper arbor 6 and the other rod 38 and the threaded shaft 36 being above the arbor 6.

Figure 4:
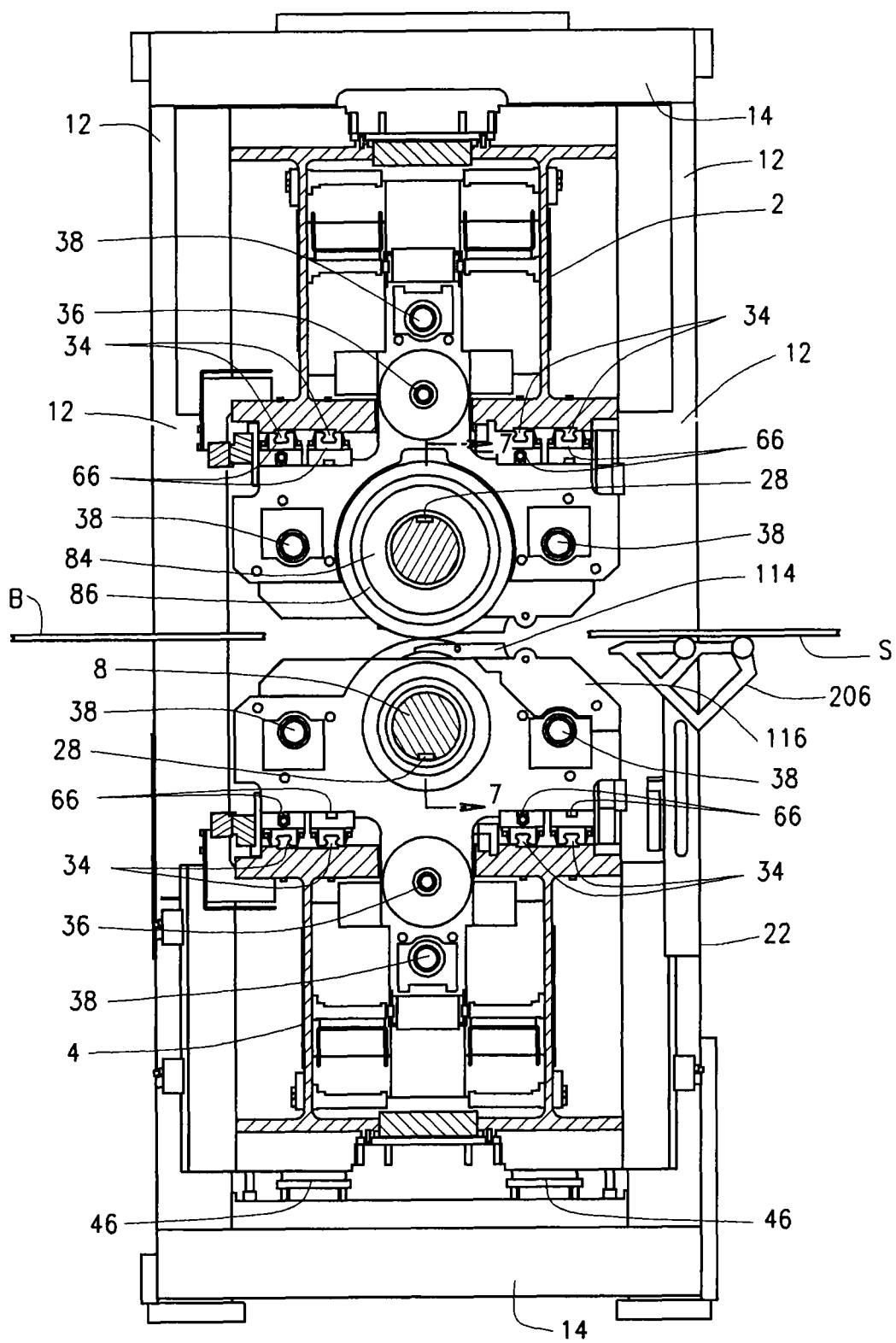
FIG. 4 is a sectional view taken along line 4-4 of FIG. 3.
Figure 5:
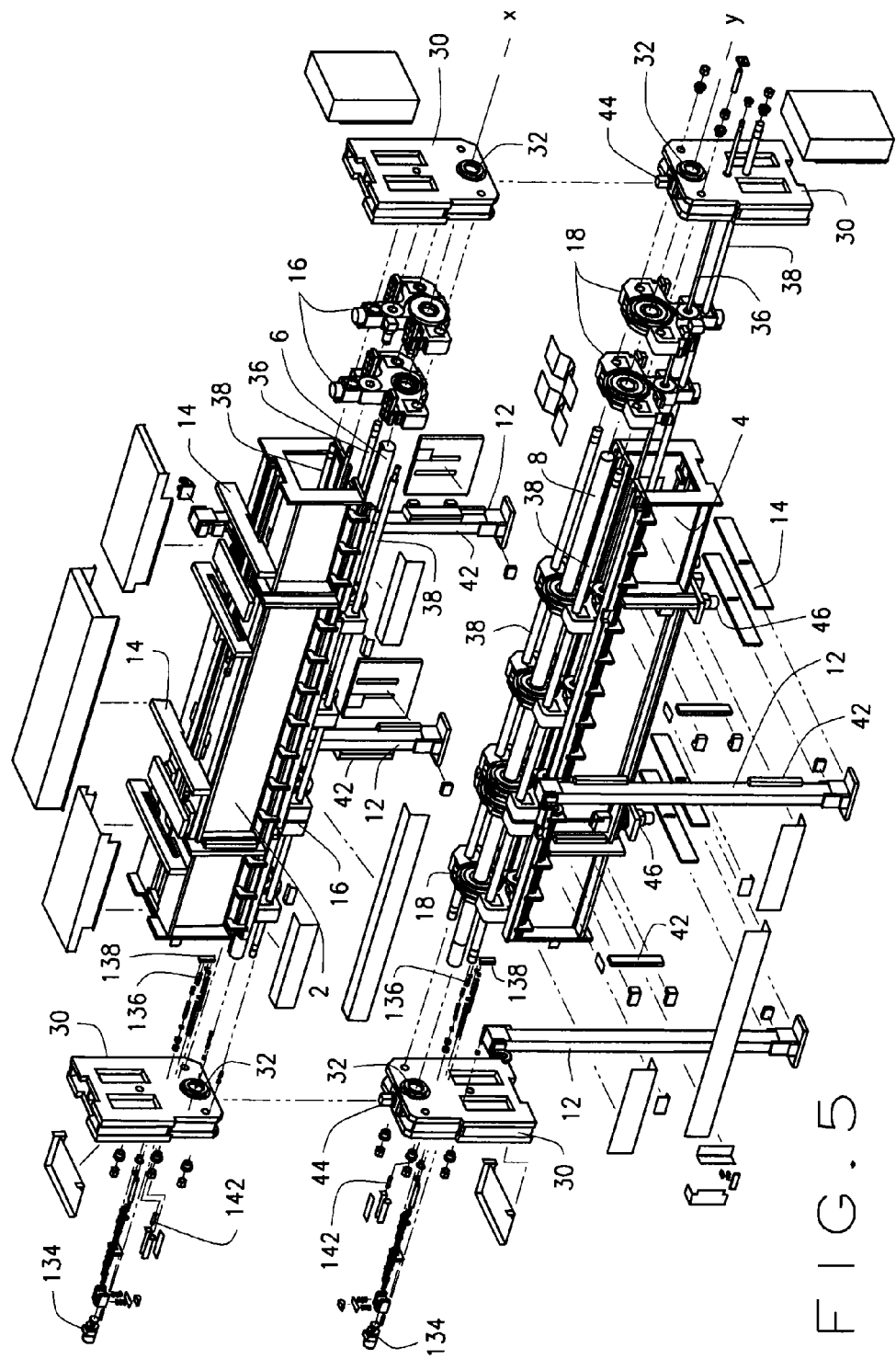
FIG. 5 is an exploded perspective view of the machine as observed from the entry side of the machine.

The lower beam 4 corresponds to the upper beam 2 in shape and components, but is inverted in position (FIGS. 4 & 5). As such the lower beam 4 has a channel-shaped cross section. Moreover, it has end members 30 provided with bearings 32 that support the lower arbor 8, yet allow the lower arbor 8 to slip axially within them and even withdrawn from the bearing 32 that is remote from the drive unit 20. The lower arbor 8 extends through the several lower slitter heads 18 which rest on and slide along ways 34 on the beam 4. The lower beam 4 also contains a threaded shaft 36 that extends between its end members 30 and is prevented from rotating and displacing axially and lock rods 38 that likewise extend between the end members 30, but cannot be displaced axially. Two of the rods 38 lie to the sides of the lower arbor 8, while the third and the threaded shaft 36 lie below the arbor 8. All pass through the lower slitter heads 18. The ways 34, threaded shaft 36 and lock rods 38 of the lower beam 4 lie parallel to the axis y of the lower arbor 8.

Apart from being an inversion of the upper beam 2, the lower beam 4 has the capacity to move upwardly and downwardly in the frame 10, toward and away from the upper beam 2. To this end, the lower beam 4 along its sides is fitted with slides that follow vertical gibs 42 (FIGS. 2 & 5) on the uprights 12 of the frame 10. Moreover, the end members 30 of the lower beam 4 have studs 44 that project upwardly into the end members 30 of the upper beam 2, but do not inhibit the lower beam 4 from moving vertically. They do, however, transfer thrust loads imposed on the lower beam 4 to the upper beam 2 and frame 10. Between the lower cross members 14 of the frame 10 and the bottom surface of the beam 4, are screw jacks 46 (FIGS. 4 & 5) that are powered by hydraulic motors and operate in unison to raise and lower the beam 4 such that the axis y of its arbor 8 always remains parallel to the fixed axis x of the upper arbor 6, all with a good measure of precision.

Figure 3:
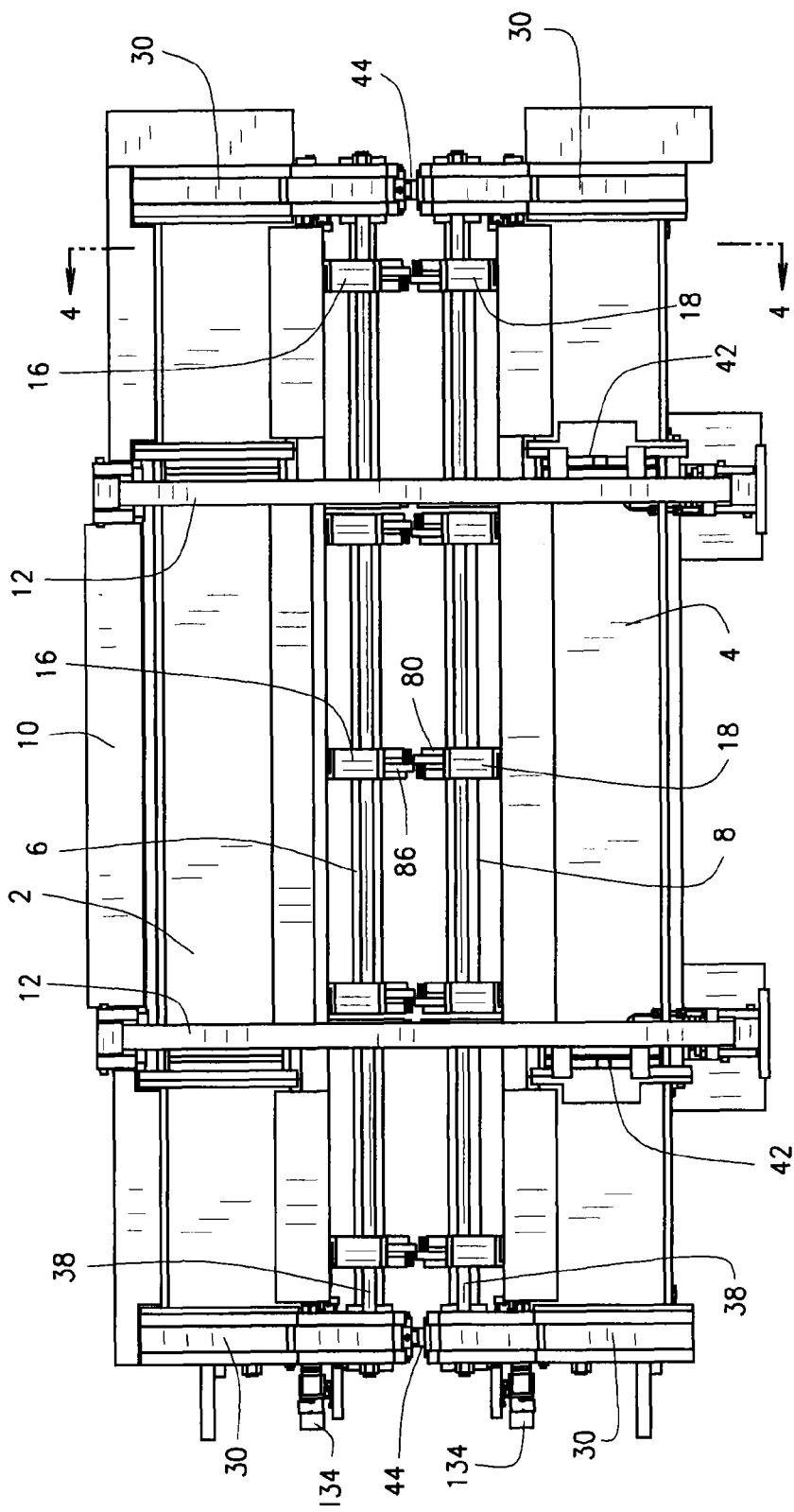
FIG. 3 is an elevational view of the entry side of the machine absent its power unit.

The upper slitter heads 16 have left and right configurations that are essentially the same, except one represents a reversal of the other (FIG. 3). The same holds true for the lower slitter heads 18. Moreover, the left upper slitter heads 16 are essentially the same as the left lower slitter heads 16, except that the latter are inverted with respect to the former. The same holds true with respect to the right upper slitter heads 16 and right lower slitter heads 18. With that in mind, consideration of one of the right lower slitter heads 18 should suffice for understanding any one of the slitter heads 16, 18.

Figure 6:
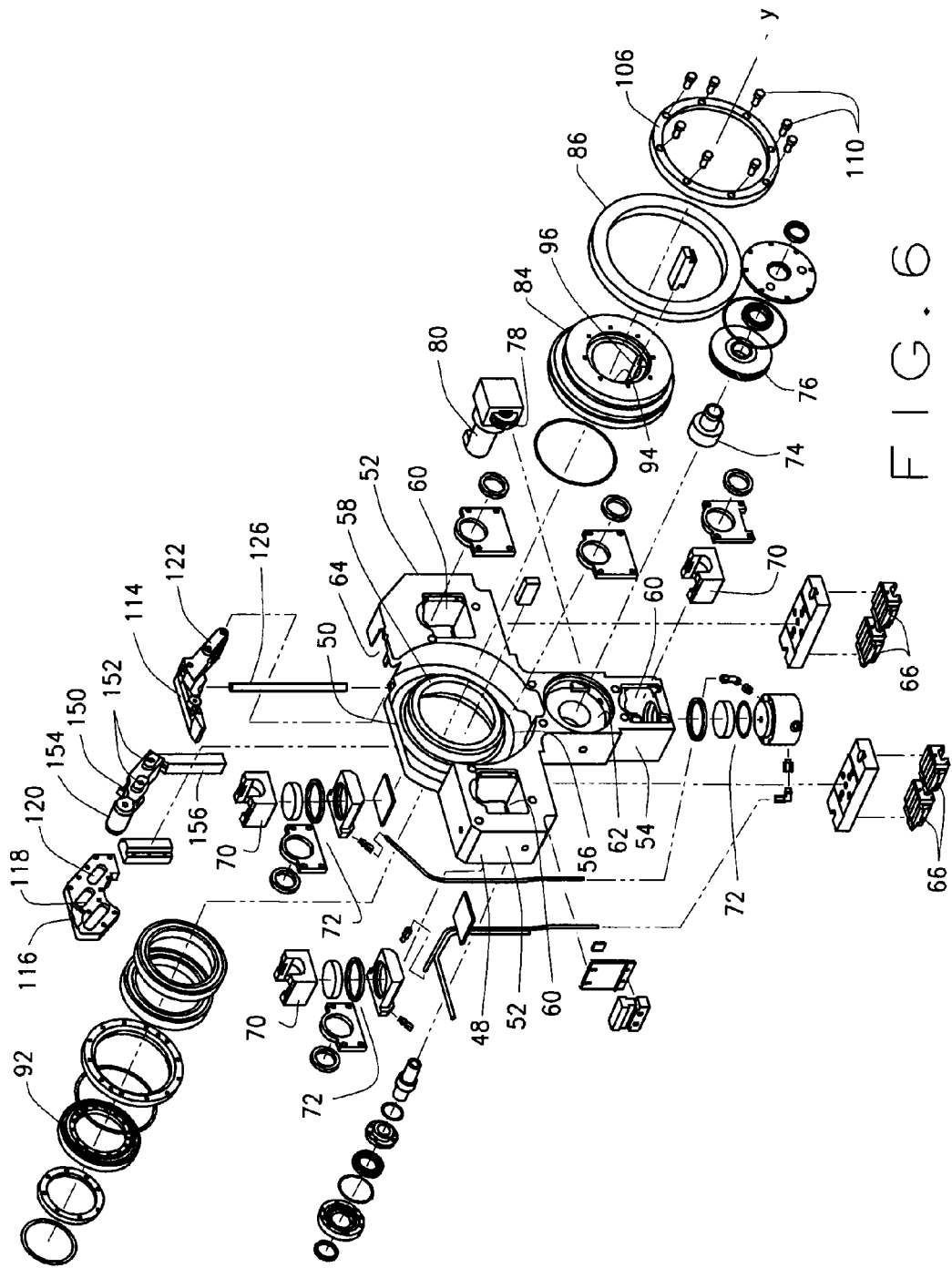
FIG. 6 is an exploded perspective view of one of the lower slitter heads viewed from the entry side of the head.

The slitter head 18 (FIGS. 4 & 6) has a housing 48 of generally T-shaped configuration, in that it has an enlarged center section 50 between two lateral wings 52 and a vertical lower arm 54. The center section 50 contains a cylindrical, although truncated, recess 56 into which a full annular boss 58 projects. Both the recess 56 and the boss 58 are centered along the axis y. Moreover, the lower arbor 8 passes through the boss 58 and the cylindrical recess 56 into which the boss 58 projects. Each lateral wing 52 has a cavity 60 through which one of the lower lock rods 38 passes. The vertical arm 54 likewise has a cavity 60 through which the lower lock rod 38 passes. The vertical arm 54 also has a cylindrical pocket 62 through which the threaded shaft 36 passes. One of the wings 52, the wing 52 on the exit side of the beam 4, is larger than the other wing 52, and it contains an irregular pocket 64 that opens out of the back of the housing 48 and also out of the top of the housing 48.

The two wings 52 are fitted with linear guides 66 (FIG. 4) that ride on, and indeed engage, the ways 34 in the lower beam 4. In this regard, each way 34 in cross section possess a bulbous upper end and a narrower neck separating the bulbous end from an enlarged base at which the way 34 is attached to the beam 4. The guides 66 have channels that correspond in cross section to the ways 34 and recirculating balls along the channels to engage the ways 34. Thus, the guides 66—and along with them the slitter head 18—will travel along the ways 34, but the slitter head 18 cannot be displaced upwardly or laterally with respect to the ways 34, nor can it be twisted in the beam 4. Although the slitter head 18 can slide over the ways 34 and as such move parallel to the axis y, it otherwise maintains the same orientation with respect to the axis y and the beam 4.

Figure 8:
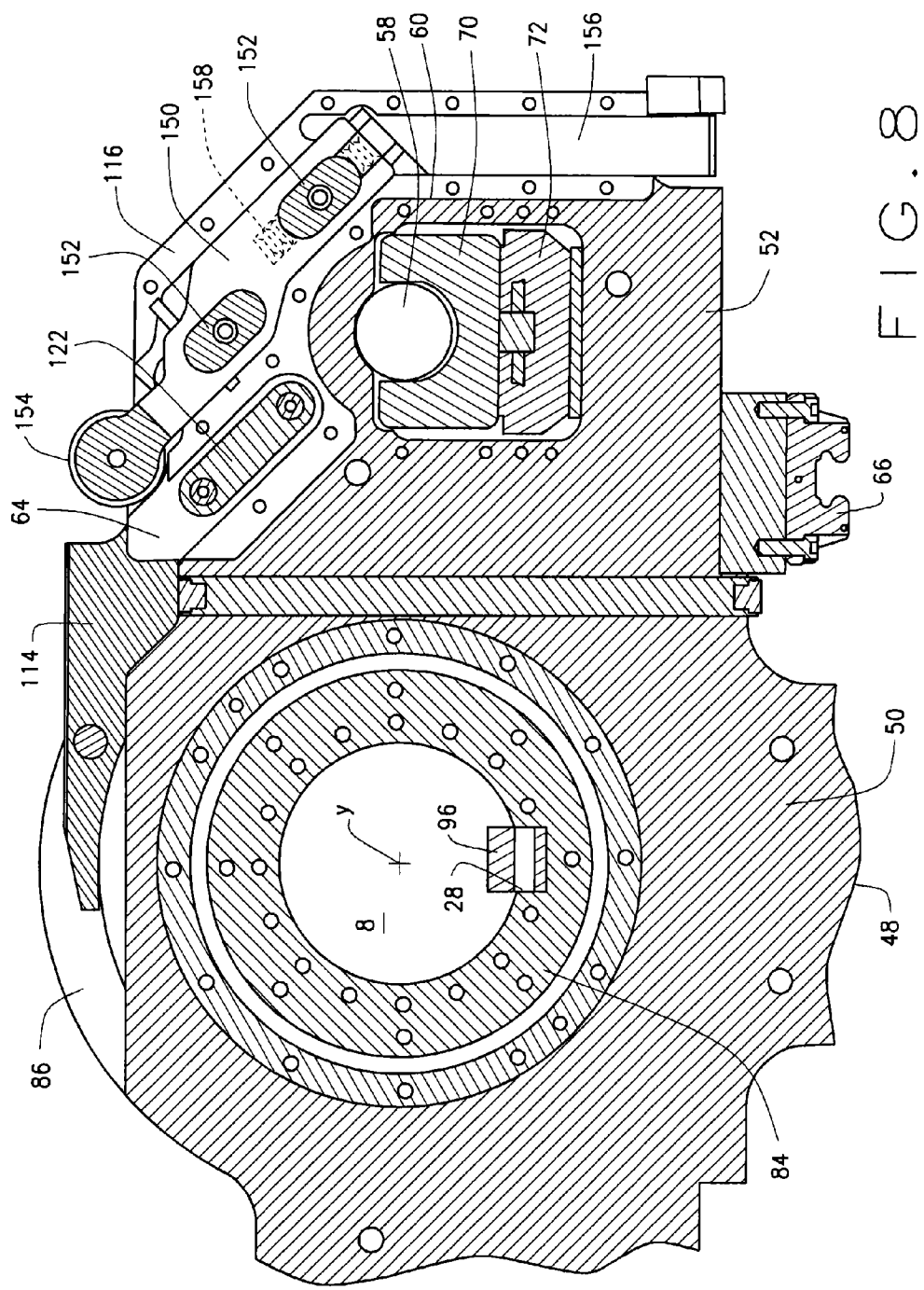
FIG. 8 is a fragmentary sectional view of one of the lower slitter heads.

Each cavity 60 in the housing 48 possesses (FIGS. 6 & 8) an arcuate upper surface that lies along the lock rod 38 that passes through the cavity 60. Below the rod 38 each cavity 60 contains a clamp or lock block 70 that also has an arcuate surface that is presented toward the rod 38. Springs normally urge it away from the upper arcuate surface. The cavity 60 also contains a hydraulic cylinder 72 that, when energized, overcomes the force exerted by the springs and drives the lock block 70 against the lock rod 38, causing the lock rod 38 to be clamped tightly between the arcuate upper surface in the cavity 60 and the arcuate surface on the lock block 70. The three hydraulic cylinders 72 operate in unison, and when energized, their lock blocks 70 prevent the lower slitter head 18 of which they are a part from displacing axially along the axis y in the beam 4. Together with the linear guides 66, the lock blocks 70, when their cylinders 72 are energized, secure the slitter head 18 in a fixed position in the lower beam 4.

The cylindrical pocket 62 contains (FIG. 6) a nut 74 that is engaged with the threaded shaft 36 that passes through the pocket 62. The nut 74 is fitted with a spur gear 76 that also occupies the pocket 62 so that when the spur gear 76 rotates, so does the nut 74, causing the slitter head 18 to move axially along the arbor 8, assuming of course that the hydraulic cylinders 72 remain deactivated. The spur gear 76 is driven by a pinion 78 that forms part of a hydraulic gear motor 80 attached to the vertical arm 54 of the housing 48.

The truncated cylindrical recess 56 contains (FIGS. 4, 6 & 7) a hub 84 on which a slitter knife 86 is mounted such that the knife 86 projects out of the truncated region of the recess 56 and above the housing 48. The hub 84 fits around the lower arbor 8 that passes through the recess 56 and is rotated by the arbor 8. The hub 84, of course, rotates the knife 86. The hub 84 at its one end has an annular recess 88 (FIG. 7) that surrounds an annular stub shaft 90. The recess 88 receives the annular boss 58 in the cylindrical recess 56 of the housing 48, all such that the stub shaft 90 on the hub 84 lies within the annular boss 58. Between the annular boss 58 and the stub shaft 90 a pair of antifriction bearings 92, preferably ball bearings, support the hub 84 on the housing 48 such that the hub 84 and knife 86 can rotate in the recess 56 of the housing 48. The hub 84 has a center bore 94 through which the lower arbor 8 extends. The hub 84 also is provided with a key 96, which is confined to the hub 84 and fits within the keyway 28 of the arbor 8. Thus, torque applied to the arbor 8 is transferred to the hub 84 and the knife 86 on the hub 84. The hub bore 94 is slightly larger in diameter than the arbor 8, and the key 96 fits loosely within the keyway 28, thus enabling the hub 84 to slide easily over the arbor 8, but not rotate relative to the arbor 8. The hub 84 on its periphery has a cylindrical mounting surface 98 and a flange 100, with the surface 98 leading away from the flange 100.

The knife 86 (FIGS. 6 & 7) takes the form of a circular ring having a cylindrical exterior surface 102 that may be about 1.25 in. in width and 15 in. in diameter. The surface 102 intersects one of the side faces to establish a circular cutting edge 104. The knife 86 fits over the mounting surface 98 on the hub 84 and against the flange 100, it being secured by a retainer ring 106 that fits over the hub 84 and has an axially directed lip 108 that bears against the knife 86. The ring 106 is secured with machine screws 110 that thread into the hub 84 and clamp the knife 86 between the flange 100 and the lip 108 of the ring 106. When the knife 86 is so disposed, it for the most part lies within the cylindrical recess 56 of the housing 48, but does project radially out of the housing 48 at the truncated region of the recess 56.

The knife 86 along its cutting edge 104 forms a nip with the knife 86 of corresponding upper slitter head 16 (FIG. 7), again at the cutting edge 104 of the upper knife 86. The two knives 86, that is the knife 86 on the lower slitter head 18 and the knife 86 on the upper slitter head 16, are offset axially. The envelopes formed by the cylindrical exterior surfaces 102 of the two knives 86 may or may not overlap at the nip that the cutting edges 104 form. When the metal sheet B passes through that nip, it is severed at the cutting edges 104, producing a slit C and two strips S that the slit C separates.

Figure 9:
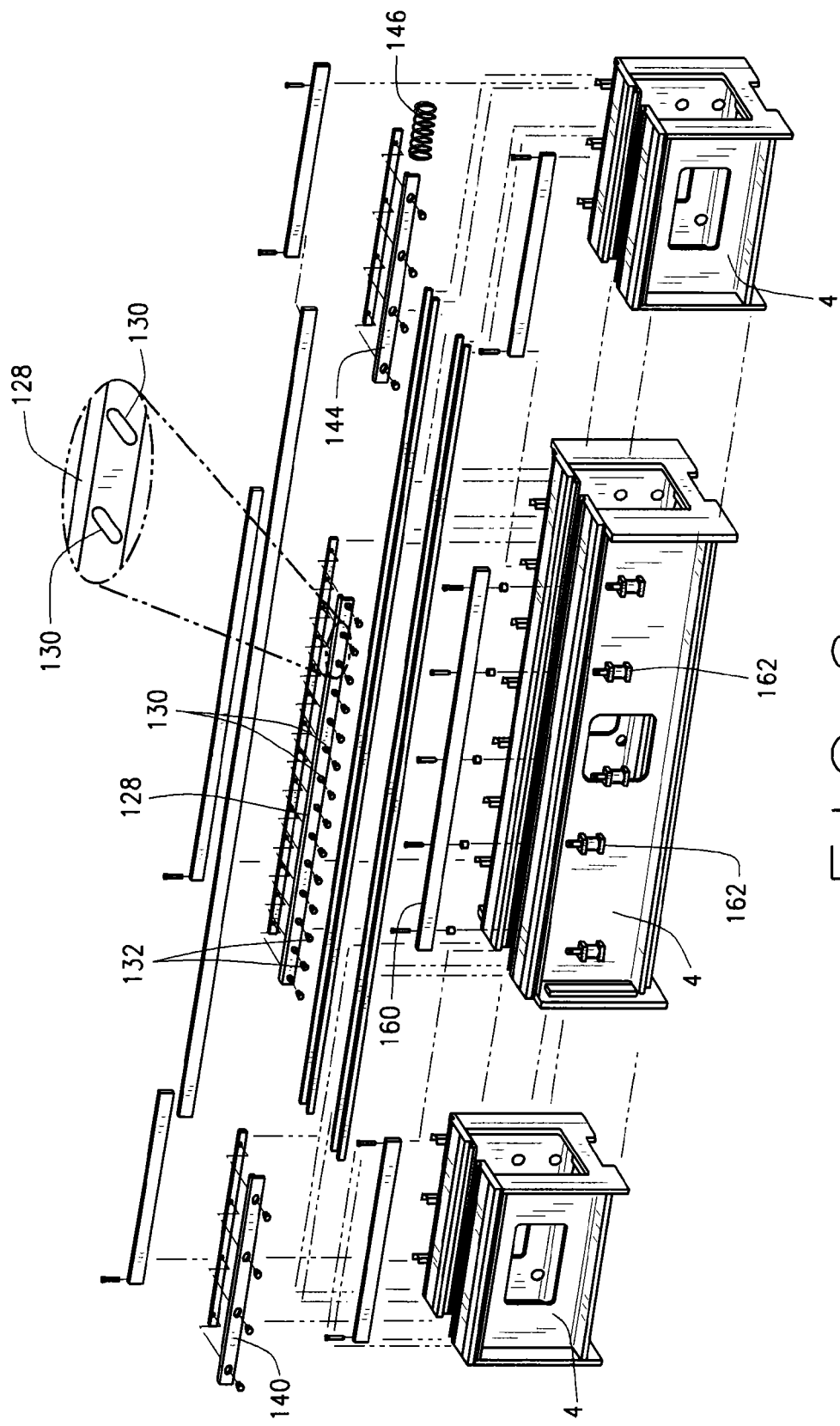
FIG. 9 is an exploded perspective view of the lower beam viewed from the entry side of the machine and showing the actuator bars for the stripper fingers and the pinch rolls.

The irregular pocket 64 in the housing 48 houses a stripper finger 114 (FIGS. 6 & 8)—or at least the tail portion of the stripper finger 114—that lies along the side face of the slitter knife 56. To this end, the pocket 64 is closed along one side by a cover plate 116 that contains elongated slideways 118 and 120. The pocket 64 on its sidewall that lies opposite to the cover plate 116 has corresponding slideways 118 and 120 that align with the slideways 118 and 120 in the cover plate 116. Along the sides of its tail portion, the stripper finger has keys 122 that project into the slideways 118 and enable the finger 114 to move between a retracted position and an extended positions. In both positions the operative end of the finger 114 projects out of the pocket 64 and lies along that one side face of the slitter knife 86 that is along the cutting edge 104. However, in an extended position the finger 114 lies closer to the cylindrical envelope established by the exterior surface 102 of the knife 86. The stripper finger 114 is urged by a spring to its retracted position, but is capable of moving to extended positions under a force exerted by a push rod 126 (FIG. 6) that is located in the housing 48, with the exact extended position being variable and dependent on the thickness of the metal sheet B being slit. At its upper end the push rod 126 bears against the stripper finger 114. Its lower end lies along an actuator bar 128 (FIG. 9) that extends through the active region of the lower beam 4 parallel to the axis y. The bar 128 contains multiple slots 130 that are oblique to the axis of the bar 126 and parallel to each other. The slots 130 contain cam followers 132 that are fixed in position with respect to the beam 4. The push rods 126 for all of the lower slitter heads 18 in the active region of the machine A bear against the actuator bar 128, and when the cam followers 132 are at the upper ends of the slots 130, the stripper fingers 122 are in their retracted positions. However, when the bar 128 is displaced longitudinally, the slots 130 move over the followers 132 and the bar 128 rises, elevating the push rods 126 and fingers 114 for the lower slitter heads 18. In other words, the slots 130 serve as camming surfaces that impart a vertical displacement to the bar 126—and to the push rods 126.

The position of the actuator bar 126 is controlled by a hydraulic motor 134 (FIG. 5) mounted on the end member 30 that is located remote from the drive unit 20. The motor 134 turns a screw 136 that in turn engages a drive block 138 that is in effect a nut. The drive block 138 bears against an end bar 140 that lies within the storage region of the beam 4 where it displaces longitudinally but not vertically. The end bar 140 bears against the actuator bar 128. Thus, when the hydraulic motor 134 moves the end bar 140 longitudinally toward the other storage region of the beam 4, it shifts the actuator bar 128 in the active region longitudinally, and owing the slots 130, the actuator bar 128 rises and drives the push rods 126 in the active region upwardly. The push rods 128 move the stripper fingers 114 in the active region of the beam 4 to their extended positions. The precise position of the actuator bar 128 and the fingers 122 that it positions is monitored by a sensor 142 located along the screw 136. The sensor 142 controls the motor 134.

The other storage region of the lower beam 4, that is the region located adjacent to the drive unit 20, contains another end bar 144 (FIG. 9) that is likewise capable of displacing longitudinally, but not vertically. It is urged against the actuator bar 128 in the active region of the beam 4 by a spring 146 located in the end member 30 that closes that storage region. The spring 146 eliminates backlash and free motion in the actuator bar 128.

The irregular pocket 64 in the housing 48 also holds a pinch roll mount 150 (FIG. 8) having keys 152 that project into the other slideways 120 in the cover plate 116 and opposite wall of the pocket 64. The pinch roll mount 150 carries a pinch roll 154 that rotates about an axis that is parallel to the axis y. The pinch roll 154 is set inwardly from the stripper finger 114 such that it lies at the exit side of the knife 86 with the cutting edge 104 of the knife 86, being midway between the ends of the roll 154. The keys 152 on the mount 150 are confined to the slideways 120 and enable the mount 150 and the pinch roll 154 on it to move between a retracted position and an extended position. The roller mount 150 is urged to its retracted position by a spring located within the mount 150, and is displaced to its extended position by a push bar 156 that is located in the housing 48. The push bar 156 when it rises exerts a force on the mount 150 through a pack of Belleville springs 158 located within the mount 150.

While the upper end of each push bar 156 bears against the Belleville springs 158 in the pinch roll mount 150, the lower ends of the push bars 156 for those slitter heads 18 that are in the active region of the frame 10 rest on an actuator bar 160 (FIG. 9) that extends through the active region of the lower beam 4 where it is offset laterally from the actuator bar 128 for the stripper fingers 114. The actuator bar 160 can displace upwardly and downwardly, with its displacement being effected by several hydraulic cylinders 162 located along the lower beam 4.

When the hydraulic cylinders 162 are activated, each pinch roller mount 150 in the active region will move to its extended position. In so doing each pinch roll 154 in the active region will bear against the bottom of two strips at the slit C separating those strips. The pinch roll 154 on the corresponding upper slitter head 16 will counteract that force. In effect, the two pinch rolls 154 compress the two adjacent strips S at the slit C between them, and this serves to remove burrs and irregularities at the slit C. U.S. Pat. No. 6,857,350, which is incorporated herein by reference, provides a fuller description of the operation of the pinch rolls 154. When the roller mount 150 is in its retracted position, its pinch roll 154 is remote from the strips S and lies partially within the irregular pocket 64 and within the stripper finger 122.

Figure 7:
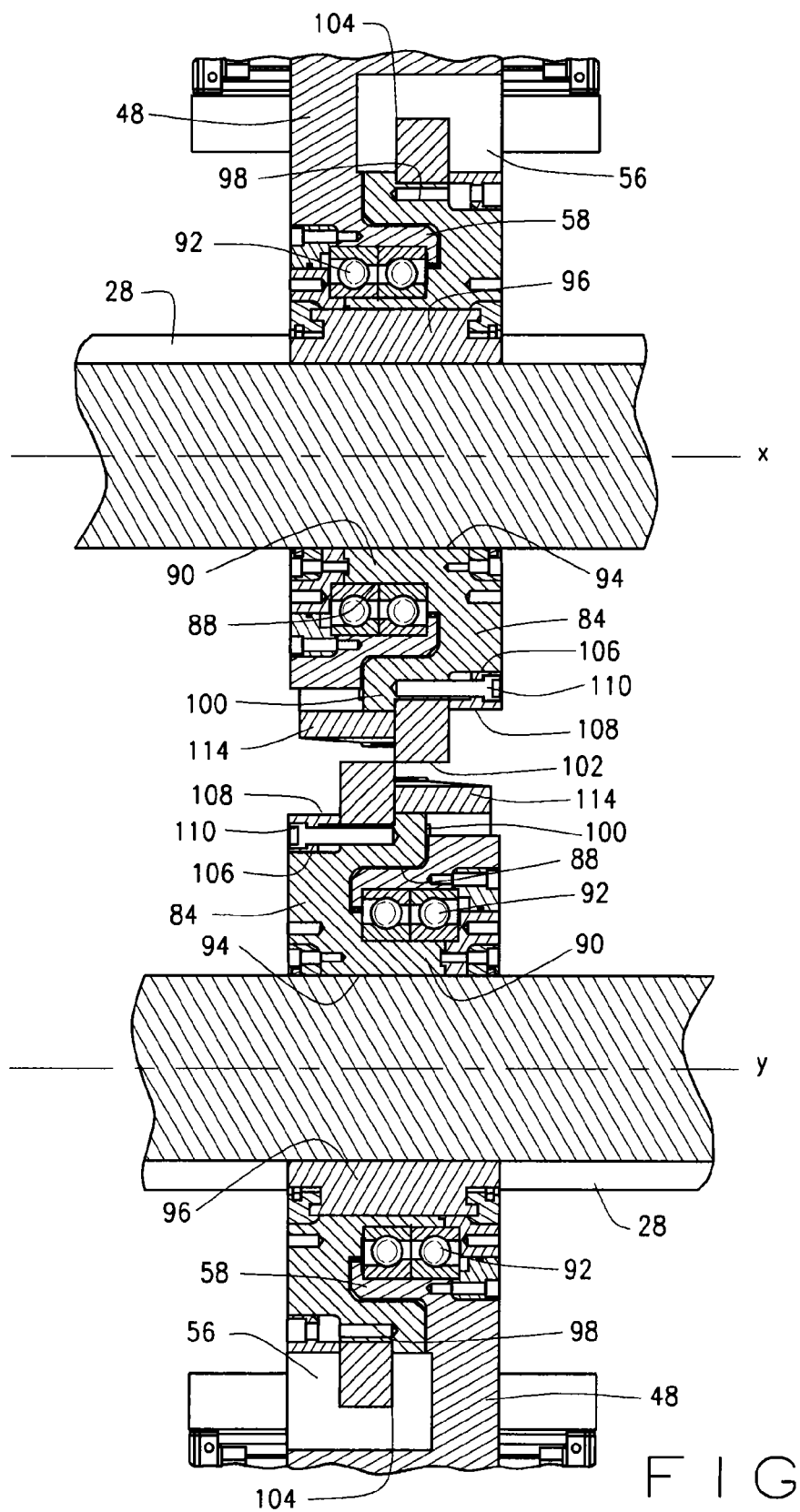
FIG. 7 is a fragmentary sectional view of a pair of lower and upper slitter heads taken along line 7-7 of FIG. 4

The upper slitter heads 16 are essentially the same as the lower slitter heads 18. However, the upper heads 16, instead of resting on their ways 34, are at their linear guides 66 suspended from the ways 34 of the upper beam 2 (FIG. 4). The cross-sectional configuration of the ways 34 and the linear guides 66 that on the upper housings 48 enable the upper slitter heads 16 to remain suspended from the upper beam 2 and to travel along the beam 2 parallel to the upper axis x without displacing laterally or twisting. When the machine A is set up for slitting, the upper and lower slitter heads 16 and 18 are arranged in pairs, their being within any pair an upper head 16 and a lower head 18. Within any pair, the cutting edge 104 of the slitter knife 86 in the upper slitter head 16 is exposed and at its cutting edge 104 is separated only slightly from the cutting edge 104 of the slitter knife 86 in the lower slitter head 18. When the two slitter heads 16 and 18 of the pair are moved along their respective ways 34 until the cutting edges 104 of their knives 86 lie almost in the same plane, the two knives 86 along their cutting edges 104 produce the nip at which the metal strip B is severed at a slit C into adjacent strips S (FIG. 7).

Actually, the slitter heads 16 and 18 are not truly squared with respect to the ways 34 along which they travel, and as a consequence the axes about which hubs 84 rotate are not precisely parallel to the axes x and y of the arbors 6 and 8. Instead, the axes of the hubs 84 are skewed slightly with respect to the ways 34, and this leaves the upper and lower knives 86 for any pair of slitter heads 16 and 18 angled with respect to each other. The slight clearance that exists between the center bore 94 of each hub 84 and the arbors 6, 8 around which the hubs 6, 8 are located permits the axes about which the hubs 84 rotate to skew with respect to the axes x, y of the arbor 6, 8. The angulation is such that the knives 86 diverge slightly beyond the nip formed by them. In other words, the knives 86 toe outwardly downstream from the nip. The angle between the two blades 86 for any pair of upper and lower slitter heads 16, 18 should range between about 0 degree, 1 minute, 4 seconds, and about 0 degree, 3 minutes, 13 seconds. The toe-out causes the knives 86 of any pair, upon producing a slit C, to urge the two strips S along that slit C to separate slightly. This in turn reduces abrasion along the side edges of the strips S and irregularities and burrs that may accompany the abrasion. To a measure, the same effect may be achieved by skewing only one of the knives 86 of a pair.

The drive unit 20 that powers the arbors 6 and 8 includes (FIG. 1) a track 170 and a carriage 172 that moves along the track 170, it being driven by a motor 174 that may be electrically or hydraulically powered. The carriage 172 supports an electric motor 176 and a transmission 178 that transmits power from the motor 176 to counter-rotating spindles 180—one located above the other. The upper spindle 180 is coupled through a connecting shaft 182 and universal joints to the upper arbor 6, while the lower spindle 180 is coupled through another connecting shaft 182 and universal joints to the lower arbor 8. When the motor 176 is energized, it rotates the spindles 180, which in turn rotate the arbors 6 and 8 in opposite directions—that is to say, such that the knives 86 on the slitter heads 16 and 18 in the active region draw the steel sheet B into the nips formed by those knives 86 and slit the metal sheet into strips S.

When the carriage motor 174 is energized, it moves the carriage 172 along the track 170 and thus backs the spindle motor 174 and transmission 178 away from the frame 10 and beams 2 and 4. The spindles 180 move as well and withdraw the arbors 6 and 8 from the bearings 32 in the remote end members 30 and from the slitter heads 16 and 18 in the remote storage region. The arbors 6 and 8 simply slide through the center bores 94 in all the hubs 84, within which they are loosely fitted, and from the bearings 32 in the end members 30. When fully retracted, the arbors 6 and 8 lie clear of the remote storage region. This enables workmen to service the slitter heads 16 and 18, including removing the knives 86 from their hubs 84 so that they may be sharpened. To remove a knife 86 from either one of the slitter heads 16 or 18 that is in the remote storage region, one simply removes the machine screws 110 that hold the retainer ring 106 in place. This frees the retainer ring 106 and it is removed followed by removal of the knife 86 that is behind it.

Figure 2:
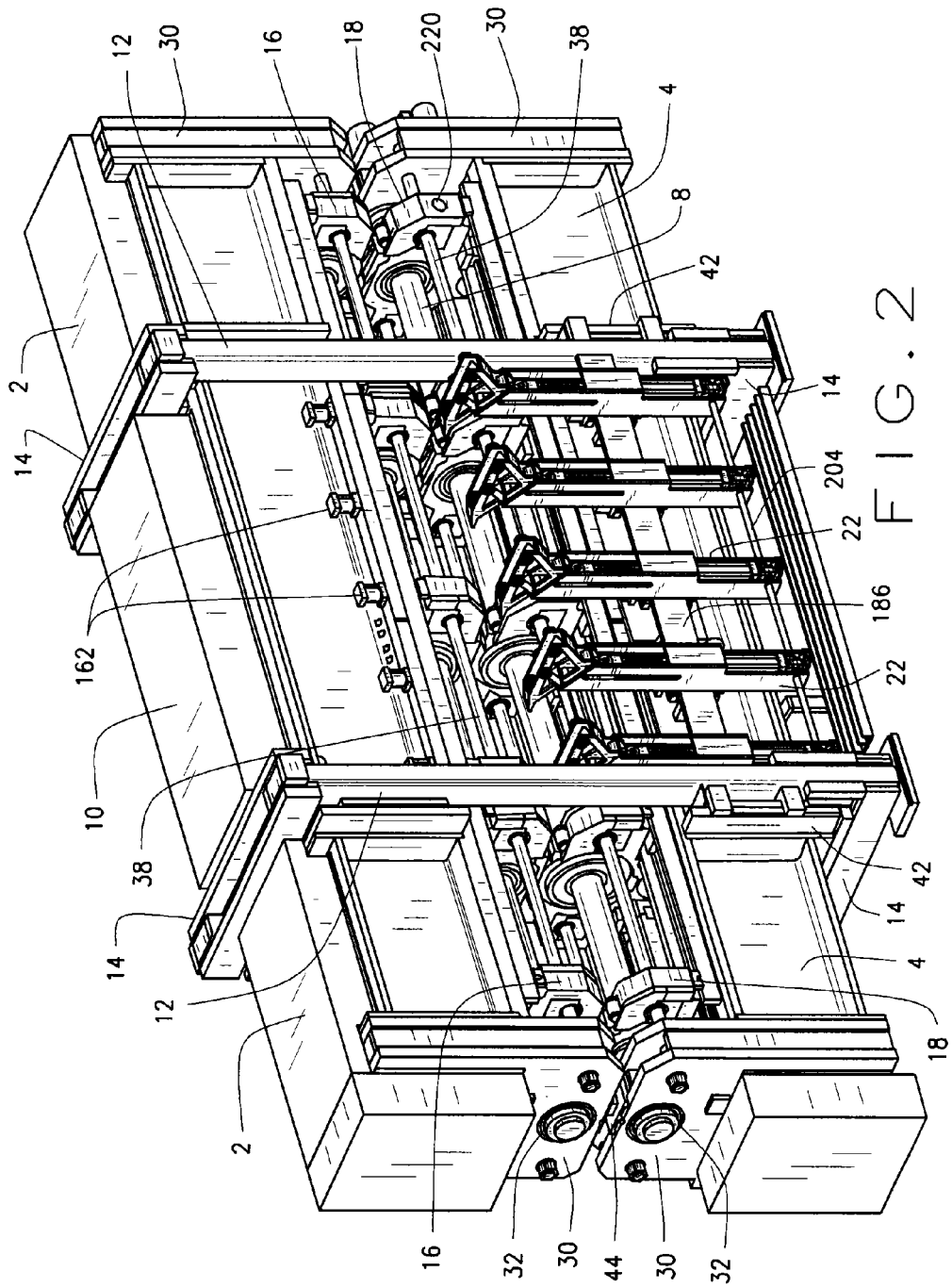
FIG. 2 is a perspective view showing the exit side of the machine absent its power unit.

The exit supports 22 lie along the lower beam 4 at the exit or downstream sides of the lower slitter heads 18—and at that, only in the active region of the machine A (FIGS. 2 & 4). Here they support the strips S as the strips S emerge from the knives 86 of the slitter heads 16 and 18 that are in the active region. The supports 22 couple with the lower slitter heads 18 that are in the active region and will move with the those heads 18 as the heads 18 are displaced along the ways 34 to their proper positions on the lower beam 4.

Figure 11:
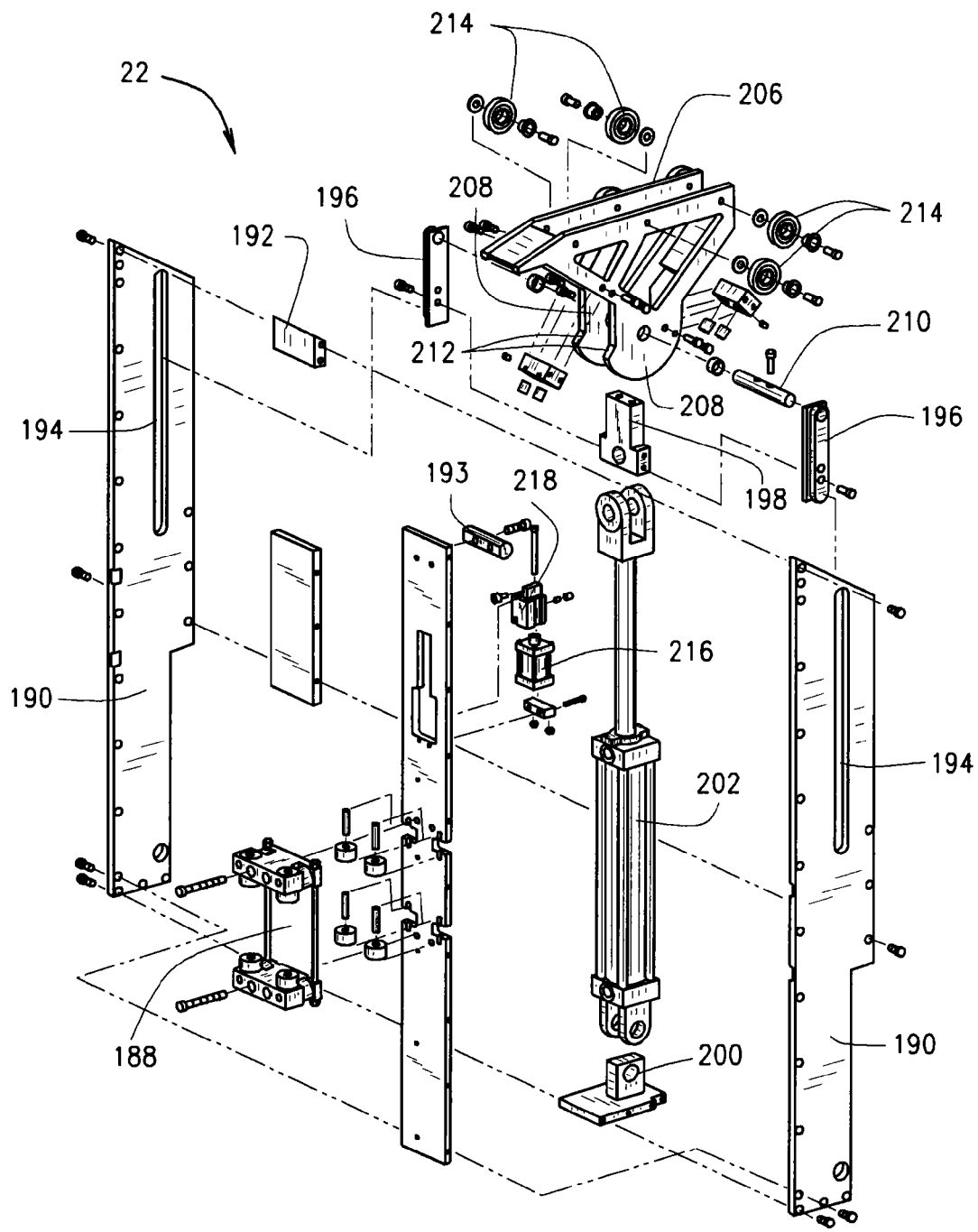
FIG. 11 is an exploded perspective view of an exit support.

To this end, the supports 22 are carried by a track 186 (FIGS. 2 & 10) that extends along and is attached to the uprights 12 on the exit side parallel to the axis y of the lower arbor 8. Each support 22 includes (FIGS. 10 & 11) a roller slide 188 that will move longitudinally along the track 186, but cannot otherwise be displaced relative to the track 186. In addition, each support 22 has an upright housing 190 that is attached to the slide 188. At its upper end the housing 190 contains a stop block 192 and immediately below it a camming block 193. Along its sides the housing 190 has vertical keyways 194 that terminate close to the upper end of the housing 190. The keyways 194 receive and laterally confine keys 196, yet enable the keys 196 to move upwardly and downwardly. The keys 196 are attached to an upper cylinder mount 198 located between the two keys 196. At its lower end the housing 190 is fitted with a lower cylinder mount 200 which is fixed in position with respect to the housing 190. Within the housing 190, an air cylinder 202 connects the two cylinder mounts 198 and 200. When energized, the cylinder 202 will move the upper cylinder mount 200 and displace the keys 196 in their respective keyways 194. The lower ends of the housing 190 for the several exit supports 22 as well as their lower cylinder mounts 200 have a common guide rod 204 extending through them.

The cylinder 202 serves to move a support shoe 206 between (FIG. 10) an elevated position, wherein it lies above the housing 190, and a retracted position, wherein it lies in front of the housing 190 below the upper end of the housing 190. The support shoe 206 has (FIG. 11) pivots 208 that lie within the housing 190 along the keys 196 and are fitted with a pivot pin 210 that extends laterally outwardly into the keys 196 in which it is secured. The pivots 208 have camming edges 212 which are against the camming block 193 when the shoe 206 is in its elevated position. Beyond its pivots 208, the shoe 206 projects out of the housing 190 and is fitted with support rollers 214.

When the shoe 206 is in its elevated position (FIGS. 2 & 4), the rollers 214 lie immediately below the strips S that emerge from the slitter heads 16 and 18 in the active region and provide underlying support for those strips S. When the shoe 206 is in its retracted position, the rollers 214 and the entire shoe 206 itself lie in front of the housing 190 below the upper end of the housing 190. The stop block 192 holds the shoe 206 in its elevated position, but shoe 206 is weighted such that it will tip from its elevated position to its retracted position when the air cylinder 122 retracts the pivot 208 in the housing 160. Conversely, when the air cylinder 122 elevates along the housing 160, the camming edges 212 of the pivot 208 encounter the camming block 193 and cause the shoe 206 to rotate about the pivot pin 210 into its elevated position.

Along its front wall above the roller mount 150, the housing 190 of each exit support 22 is provided with a small air cylinder 216 (FIG. 11) that controls a coupling pin 218, such that the pin 218 extends and retracts horizontally. The pin 218 enables the exit support 22 to couple with one of the lower slitter heads 18 and move with the slitter head 18 when the gear motor 80 for the head 18 drives the nut 74 that moves the head 18 along the lower arbor 8. In this regard, each of the slitter heads 18 along the exit face of its housing 48 is provided with a socket 220 (FIG. 2) that will receive the coupling pin 218 on any exit support 22 when the pin 218 on the support 22 is aligned with the socket 220, so that when the cylinder 216 for a selected support 22 is energized, the pin 218 will project into the aligned socket 220 and couple the slitter head 18 and the support 22.

When the shoe 206 of any exit support 22 is in its retracted position, the shoe 206 will fit beneath either of the scrap choppers 24. Thus, when fewer than all of the pairs of slitter heads 16, 18 are required to produce strips S, the exit supports 22 that are not required may be moved beneath and to the sides of and past the scrap choppers 24 without interfering with the scrap choppers 24.

The two scrap choppers 24 rest on a track 230 (FIG. 1) that is attached to the two uprights 12 of the frame 10 at the exit side of the frame 10. Here they can move along the track 230 to align with narrow strips S cut from the sides of the metal sheet B. Indeed, the scrap choppers 24 receive those narrow side strips S and convert them to fragments which are easily disposed. Each scrap chopper 24 includes a main housing 232 and a scoop 234 that leads from the nips of one of the endmost pairs of knives 86. The narrow strip S emerging from those knives 86 enters the scoop 234 and passes into the housing 232. Here the strip S encounters a rotor that reduces it to fragments. The rotors of the two scrap choppers 24 are powered through a common shaft 236 driven by an electric motor 238. The scrap choppers 24 are positioned along the track with air or hydraulic cylinders.

Each beam 2 and 4 carries its own hose assembly 26 (FIG. 12) to direct hydraulic fluid to the slitter heads 16 and 18 for pressurizing the hydraulic cylinders 72 that control the lock blocks 70 on the heads 16, 18 and for also supplying hydraulic fluid to the gear motors 80 so that they move the heads 16 and 18 along the beams 4 and 6. The hose assemblies 26 also couple the slitter heads 16, 18 with wires through which electrical signals are transmitted. In this regard, each slitter head 16, 18 carries a position sensor which monitors a magnetic strip located along the beam 2, 4 on which the head 16, 18 is mounted. The signal produced by the sensor reflects the precise location of the head 16, 18 along the beam 2, 4. The hose assembly 26 for the upper beam 2 is essentially the same as the hose assembly 26 for the lower beam 4, save for one being inverted with respect to the other.

Figure 14:
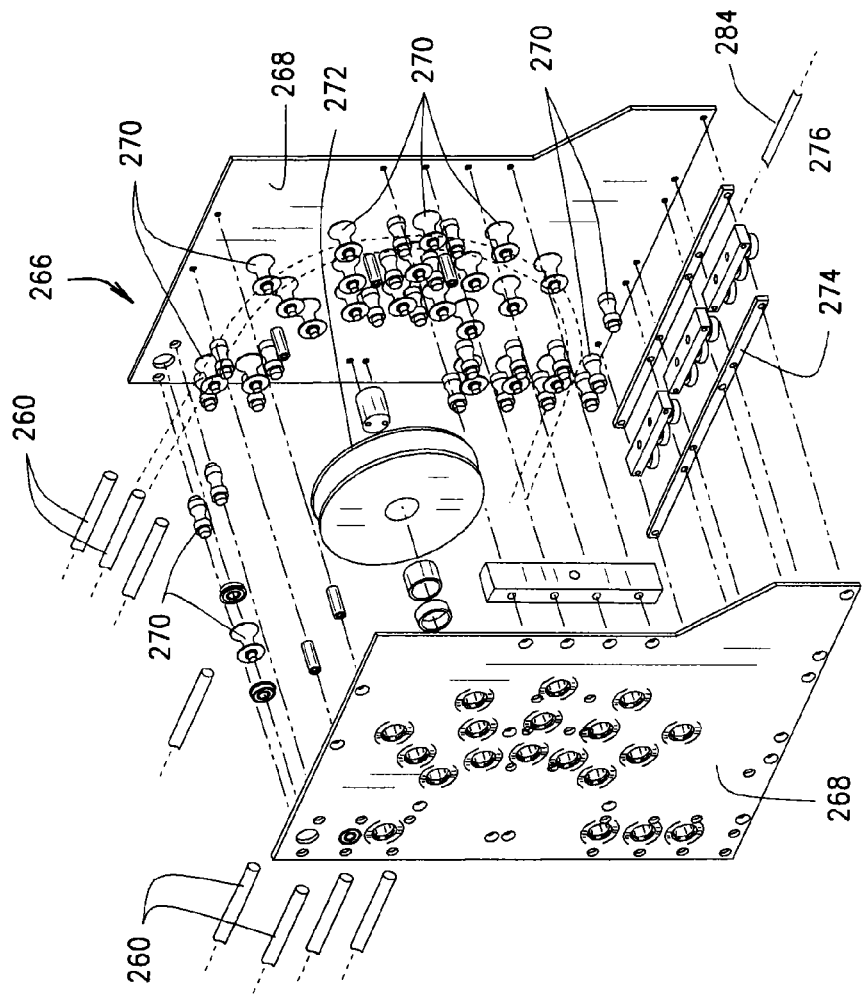
FIG. 14 is an exploded perspective view for one of the hose carriers in the lower hose assembly.
Figure 13:
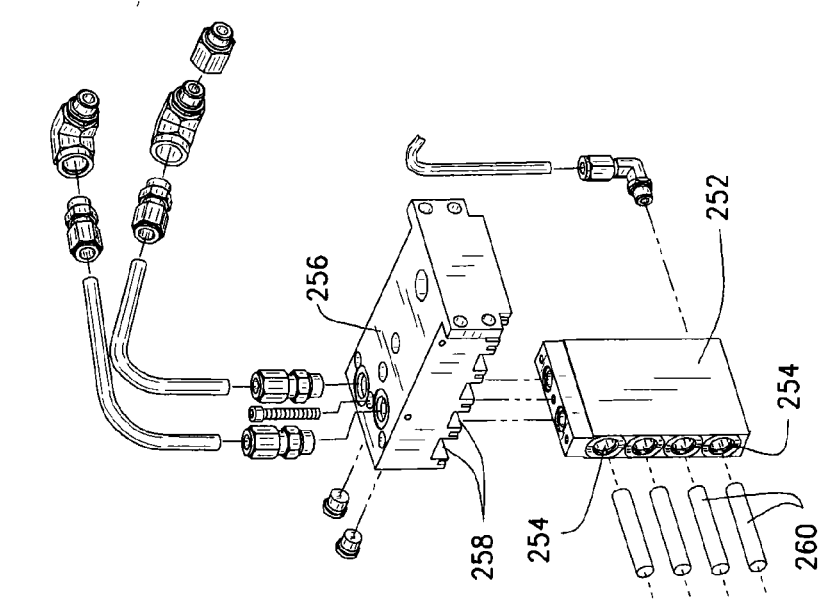
FIG. 13 is an exploded perspective view showing one of the terminal blocks for the lower hose assembly and the distributor block to which it is fitted.

The hose assembly 26 for the lower beam 4 includes (FIGS. 12-14) entry blocks 250 mounted side-by-side in positions fixed with respect to the lower beam 4 and terminal blocks 252 mounted on the lower slitter heads 18. Each entry block has ports 254, organized in groupings of four that are arranged side by side, with the four ports 254 of any grouping being arranged vertically. Each slitter head 18 has its own terminal block 252 which is mounted on distributor a block 256 attached to the bottom of the vertical arm 54 of the housing 48 for the head 18. Thus, the terminal block 252 lies at the very bottom of the slitter head 18, and it has four ports 254 also arranged vertically. Indeed, for every port 254 in a grouping of four in the entry block 250 a corresponding port 254 exists in a terminal block 252, there being vertical correspondence between ports 254 of the two blocks 250 and 252. For example, the top port 254 in a grouping of four in the entry block 250 corresponds to and communicates with the top port 254 in the terminal block 252 with which it is connected. Moreover, each grouping of four ports 254 in the entry blocks 250 occupies the same lateral position in the beam 4—although not the same vertical position—as the terminal block 252 that corresponds to and communicates with the four ports 252 in the entry blocks 250.

The distributor block 256 has grooves 258 (FIG. 13) that open downwardly, with one of the grooves 258 receiving the upper end of the terminal block 252 for its slitter head 18. The terminal blocks 252 for different slitter heads fit into different grooves 258 in their distributor blocks 256, so that no two terminal blocks 252 occupy the same lateral position in the lower beam 4.

Each port 254 in a grouping of four in an entry block 250 is connected with the port 254 in the terminal block 252 that corresponds with it through a separate hose 260 (FIGS. 12 & 14), so four hoses 260 connect a grouping of four ports 254 in the entry block 252 with the four ports 254 in the corresponding terminal block 252. The four hoses 260 for any grouping of four ports 254 in the blocks 250 and 252 are separated from the other hoses 260 in groupings of four by separator sheets 262 mounted on the beam 4. One of the hoses 260—the hose 260 of least diameter—directs hydraulic fluid to the hydraulic cylinders 72 in the slitter head 18 through lines that lead from the distributor head 256. The cylinders 72, when pressurized, clamp the lock blocks 70 against the lock rods 38 to secure their slitter head 18 in a fixed position on the beam 4. Two of the hoses 260 are coupled through the terminal block 252 and distributor head 256 to the hydraulic gear motor 80. One of those hoses 260 supplies pressurized fluid to the motor 80, while the other serves as a return for the fluid, the direction of rotation for the motor 80 determining which of the two additional hoses functions as the supply and which functions as the return. The final hose 260 serves as an electrical conduit and as such contains an electrical wire through which signals from the position sensor on the slitter head 18 are transmitted.

All four hoses 260 are quite flexible, and indeed, they must be because the ports 254 on the entry block and the ports 254 on the corresponding terminal block 252 face in the same direction, that is to say, toward the end member 30 at the end of the beam 4 that is remote from the drive unit 20. The four hoses 260 extend parallel to the axis y for most of their lengths, but intermediate their ends pass through a hose carrier 266 (FIG. 14) where they undergo a change in direction at a loop. A separate hose carrier 266 exists for the terminal block 252 of each slitter head 18 and the corresponding grouping of four ports 254 in the entry blocks 250.

Each hose carrier 266 (FIG. 14) includes parallel side walls 268 between which three sets of guide rollers 270 revolve, there being a separate set of guide rollers 270 for each of the two hoses 260 that service the hydraulic gear motor 80 and for the hose 260 that functions as an electrical conduct. The guide rollers 270 establish three tracks through the carrier 266, and within each track the hose 260 confined to that track undergoes a gentle 180° change in direction, thus forming the loop. The side walls 268 in the space between them also support a sheave 272 about which the hose 260 of least diameter undergoes a 180° change in direction, that is, the hose 260 that services the three hydraulic cylinders 72 for the lock blocks 70.

The two side walls 268 are fastened to a roller slide 274 (FIG. 14) having rollers 276 that follow a track 278 (FIG. 12) that is located in a fixed position within the beam 4. The track 278 contains grooves that extend parallel to the axis y. One of the grooves 280 within the track 280 receives the rollers 276 of the slide 274. The other grooves 280 receive the rollers 276 for other hose carriers 266 that redirect the hoses 260 for other slitter heads 18, so the separator sheets 262 lie directly over the spaces between the grooves 280. While the grooves 280 are configured to enable the rollers 276 and slide 274 to move along the track 278 parallel to the axis y, they prevent the rollers 276 and their carrier 266 from lifting out of the track 278 or tilting laterally or twisting.

In order to maintain the hoses 260 that pass through each hose carrier 266 taut, each hose carrier 266 is connected (FIG. 12) to a cable 284 that extends away from the carrier 266 towards the end member 30 at the remote end of the beam 4. There the cable 284 passes over sheaves 286 (FIG. 12) that redirect it toward the entry blocks 250, yet offset it vertically from the track 278. While one end of the cable 284 is attached to the hose carrier 266, the opposite end is attached to an air cylinder 288 that urges that end away from the sheaves 286 with a uniform force irrespective of the position of the hose carrier 266 along the track 278. Springs may be substituted for the air cylinders 288.

A computer controls the set-up of the machine A from information entered into it by an operator at a control console. That information includes the width of metal sheet B that is to be fed into the machine A, the thickness and tensile strength of the metal sheet B, and the widths of the strips S that are to be derived from the metal sheet B. With that information the computer selects the slitter heads 16 and 18 that are required to provide the slits C to form the strips S and also the narrow strips S at the sides, which become scrap. It then energizes the gear motors 80 of the slitter heads 16 and 18 that are required to produce the slits S to move those slitter heads 16 and 18 to the correct positions along their beams 6 and 8 and arbors 2 and 4. Once a selected slitter head 16, 18 reaches its proper position, the computer energizes the hydraulic clamp cylinders 72 for the head 16, 18 to lock the head 16, 18 in that position. This leaves the heads 16, 18 of any pair with the correct horizontal gaps between their knives 86. The computer also operates the screw jacks 46 that control the position of the lower beam 4 and of course the separation between the two arbors 6 and 8. That determines the penetration of the knives 86 of any pair of slitter heads 16, 18, which in turn depends on the thickness and tensile strength of the metal sheet B. When there are fewer slits C than there are pairs of slitter heads 16, 18, the slitter heads 16, 18 that are not required are moved to the storage regions on their respective ways 34 and arbors 6 and 8.

For example, in order to move one of the lower slitter heads 18 to a desired position on the lower arbor 8, the computer causes hydraulic fluid to be directed to the gear motor 80 of that slitter head 18. The gear motor 80 turns the pinion 78 that is connected to it, which in turn rotates the spur gear 76 with which it is engaged. The spur gear 76 turns the nut 74 which travels along the stationary threaded shaft 36, bringing the entire slitter head 18 with it. As it moves, the slitter head 18 passes one of the exit supports 22. When the retracted coupling pin 188 on that support 22 aligns with the socket 220 in the housing 48 of the slitter head 18, the computer energizes the air cylinder 216 in the housing 190 of the exit support 22. The coupling pin 218 projects into the socket 220 of the slitter head 18, and the support 22 then moves with the slitter head 18, passing along the track 186 and guide rod 204 as it does. When the slitter head 18 reaches its operating position, the computer activates the air cylinder 202 for the exit support 22 connected to it, and the air cylinder 202 moves the shoe 206 for that support 22 to its elevated position.

The computer monitors the location of the slitter head 18 through the position sensor carried by the head 18. It tracks the magnetic strip located along the lower beam 4.

Once the slitter head 18 reaches a location at which the knife 86 on it will, in cooperation with a knife 86 on an upper slitter head 16, produce a slit C at the correct location in the metal sheet B, the computer terminates the flow of hydraulic fluid to the gear motor 80 of the slitter head 18. The nut 74 stops rotating and the slitter head 18 comes to rest along its arbor 8. Thereupon, the computer causes the hydraulic fluid in the three hydraulic cylinders 72 of the slitter head 18 to undergo pressurization. The cylinders 72 clamp the lock blocks 70 against lock rods 38 so that the slitter head 18 is secured firmly to the lock rods 38 and cannot displace longitudinally or laterally with respect to the rods 38 or twist relative to the rods 38. Also, the computer causes the main air cylinder 202 of the exit support 22 that is coupled to the head 18 to be energized. The air cylinder 202 moves the support shoe 206 of the support 22 from its retracted position to its extended position and thus presents the shoe 206 and its support rollers 214 immediately beyond nip established by knife 86 for the lower slitter head 18 and a knife 86 for the upper slitter head 16 that is paired with the lower slitter head 16.

The computer also positions the upper slitter head 16 that is paired with the lower slitter head 18 such that the horizontal gap between the knives of the slitter heads 16, 18 is commensurate with metal sheet B that is to be slit. The set-up for the upper head 16 corresponds to the set-up for the lower head 18, although the upper head 16 does not engage and move one of the exit supports 22.

Other pairs of slitter heads 16, 18 are positioned along the arbors 6 and 8 in a like manner.

The knives 86 on the upper slitter heads 16 tend to deflect the strips S at their edges downwardly, whereas the knives 86 on the lower slitter heads 18 level to deflect the strips S upwardly. And while the stripper fingers 114 minimize the deflection, deflection still occurs. To prevent any strip S that is severed from the metal sheet B from twisting, the knives 86 on each side of the strip S should deflect the strip S in the same direction. This requires arranging the slitter heads 16 such that heads of corresponding orientation alternate along the arbor 6. Thus, where the initial stripper head 16 on the arbor 6 is a left head 16, the next should be a right head 16 and the next a left head 16, etc.

Once the slitter heads 16 and 18 that will actually slit the metal sheet B are positioned correctly along their respective arbors 6 and 8 in the active region of the machine A, the hydraulic motors 134 for the stripper fingers 114 are actuated. They shift the actuator bar 128 that extends through active regions of the two beams 2 and 4 and the slitter heads 16 and 18 on them. The bars 128 displace vertically, owing to the oblique slots 130 in them, and extend the push rods 124 which in turn move the stripper fingers 114 to their extended positions. The magnitude of displacement for the bars 128 and the extended positions for the stripper fingers 114 depends on the thickness of the metal sheet B, and is controlled by the motor 134 and monitored by the sensor 142.

Of course, as the metal sheet B passes through the nips established by the knives 86 of each pair of slitter heads 16 and 18 in the active region, those knives 86 sever the sheet B into narrower strips S. After the lead ends of the strips S emerge from the knives 86, the computer actives the hydraulic cylinders 162 which displace the actuator bars 160 in the beams 2, 4 and extend the push bars 156 for the pinch rolls 154. For any pair of slitter heads 16, 18 the pinch rolls 154 compress the strips S on each side of the cut C formed by the knives 86 of those heads 16, 18. This reduces burrs and rippling along the edges of the strips S.

At the nip formed by the knives 86 of any pair of slitter heads 16, 18, forces develop which tend to urge the knives 86 apart. The multipoint securements created by the lock blocks 70 and their hydraulic cylinders 72 hold the slitter heads 16, 18 for any pair of knives 86 firmly in place and minimize deflections caused by those separating forces. Even so, the knives 86 of any pair, being skewed such that they toe outwardly toward the exit side of the frame 10, cause the strips S created by the cut C formed by these knives 86 to separate slightly, and this further reduces the formation of burrs and ripples at the edges of those strips S.

The hydraulic cylinders 72 and gear motors 80 on the slitter heads 16 and 18 need not operate through a computer interface. Instead, they may be controlled manually. The same holds true for the motors that control the screw jacks 46, the motors 134 for the stripper fingers 114, the hydraulic cylinders 162 for the pinch rolls 154, the motors 174 and 176 of the drive unit 20, and the air cylinders 202 and 216 for the exit supports 22.

Electric motors may be substituted for the hydraulic gear motors 80, with the electrical leads for those motors extending through hoses 160 in the hose assemblies 26. The frame 10 may have only one storage region.

The invention claimed is:

1. A machine for slitting metal sheet, said machine comprising:
   a first arbor mounted for rotation about a first axis;
   a second arbor mounted for rotation about a second axis that is parallel to the first axis;
   first elongated lock elements located parallel to and in fixed positions with respect to the first axis;
   second elongated lock elements located parallel to and in a fixed position with respect to the second axis;
   a first slitter head located along the first arbor and along the first lock elements; the first slitter head including:
      a hub located around the first arbor, the hub being engaged with the first arbor for rotation with the first arbor, yet being displaceable along the first arbor;
      a knife carried by and rotatable with the hub; and
      clamps for clamping against the first lock elements and securing the first slitter head from axial movement along the first arbor;
   a second slitter head located along the second arbor and along the second lock elements, the second slitter head including:
      a hub located around the second arbor, the hub being engaged with the second arbor for rotation with the second arbor, yet being displaceable along the second arbor;
      a knife carried by and rotatable with the hub; and
      clamps for clamping against the second lock elements and securing the second slitter head against axial movement along the second arbor;
   whereby the knives of the first and second slitter heads can be positioned to establish a nip through which metal sheet upon passing will be severed into separate strips;
   wherein the clamps are actuated by a pressurized fluid;
   a first beam supporting the first arbor and first slitter heads;
   a second beam supporting the second arbor and second slitter heads;
   a first hose assembly carried by the first beam for directing pressurized fluid to the first slitter heads; and
   a second hose assembly carried by the second beam for directing pressurized fluid to the second slitter heads;
   each hose assembly including;

an entry block mounted on the beam that carries the hose assembly;

a terminal block carried by each slitter head on the beam that carries the hose assembly;

a flexible hose extending between the entry block and the terminal block for each slitter head, each hose extending from the entry block away from the slitter head and then toward the slitter head and forming a loop where it changes direction; and a hose carrier at the loop in each hose, the hose carrier being urged away from the entry and terminal blocks to maintain the hose taut.

2. A machine according to claim 1 wherein the second arbor is displaceable toward and away from the first arbor.

3. A machine according to claim 2 wherein the first slitter head is one of several first slitter heads located along the first arbor, and the second slitter head is one of several second slitter heads located along the second arbor.

4. A machine according to claim 3 and further comprising a first threaded shaft extending parallel to and fixed in position with respect to the first axis, and a second threaded shaft extending parallel to and fixed in position with respect to the second axis; and wherein each first slitter head includes a first nut that engages the first threaded shaft and a first motor for rotating the first nut and moving the first slitter head along the first arbor; and each second slitter head includes a second nut that engages the second threaded shaft and a second motor for rotating the second nut and moving the second slitter head along the second arbor.

5. A machine according to claim 4 wherein each slitter head includes a stripper finger that lies along its ring-like knife, each stripper finger being movable between extended positions, wherein it lies close to the nip formed by the knife of the head, and a retracted position located farther from the nip.

6. A machine according to claim 5 and further comprising a first beam that supports the first arbor and a second beam that supports the second arbor; and wherein each slitter head includes a push rod that bears against the stripper finger for the slitter head; wherein each beam carries an actuator bar against which the push rods for the slitter heads on that beam bear and having camming surfaces that cause the bar to displace against the push rods when the bar is shifted longitudinally parallel to the axes, and wherein each beam also carries a motor for displacing the actuator bar on that beam longitudinally to move the stripper fingers on the slitter heads on that beam toward their extended positions.

7. A machine according to claim 4 wherein each slitter head includes a roller support and a pinch roll on the support, with the pinch roll being located beyond the nip formed by the knife, such that the pinch roll will cooperate with a pinch roll on another slitter head to compress metal sheet emerging from the nip at the slit formed at the nip, the support for each pinch roll being movable to move the pinch roll from an extended position, wherein it will compress the metal sheet emerging from the nip, to a retracted position wherein the pinch roll is withdrawn from its extended position.

8. A machine according to claim 4 and further comprising:

a first beam that supports the first arbor, the first lock elements, and the first threaded shaft; and carries first ways that lie parallel to the first axis and support the first slitter heads such that the first slitter heads can move along the first beam parallel to the first axis;

a second beam that supports the second arbor, the second lock elements, and the second threaded shaft, and carries second ways that lie parallel to the second axis and support the second slitter heads such that the second slitter heads can move along the second beam parallel to the second axis;

and wherein the second beam is displaceable toward and away from the first beam.

9. A machine according to claim 8 and further comprising a track mounted on the second beam parallel to the second axis, and exit supports mounted on the track for movement along the track parallel to the first and second axes, each exit support being engageable with one of the second slitter heads for movement with that slitter head and including a support shoe for supporting strips of metal sheet that emerge from the nip formed by the knife of the second slitter head with which the exit support is engaged and a corresponding knife of a first slitter head.

10. A machine according to claim 9 wherein at least one of the support shoes of the exit supports is moveable between an elevated position, wherein it will support the strips of metal sheet emerging from the nip, and a retracted position below the elevated position.

11. A machine according to claim 8 and further comprising a frame that includes an active region through which the metal sheet passes and a storage region; wherein the arbors extend through the active and storage regions; wherein slitter heads in the active region are positioned to slit the metal sheet; wherein the slitter heads in the storage region are located beyond the metal sheet that passes through the active region; and wherein the arbors can be withdrawn axially from the storage region and a slitter head in the storage region to service the slitter head in the storage region and the knife on that slitter head.

12. A machine according to claim 11 and further comprising a drive unit located at one side of the frame and including a motor and a transmission through which the motor is coupled to the arbors; and wherein the motor and transmission are displaceable away from the frame and, when so displaced, will retract the arbors from the storage region of the frame and from slitter heads in the storage region.

13. A machine according to claim 1 wherein the axis of at least one of the hubs and the knife carried by that hub is skewed with respect to the axis of the arbor around which the hub is located.

14. A machine according to claim 1 wherein the axes of the first and second hubs are skewed with respect to the first and second axes, respectively, such that the first and second knives carried by those hubs toe outwardly in the direction that the strips emerge from the nip.

15. A machine for slitting metal sheet, said machine comprising:

a first beam;

a second beam spaced from the first beam;

a first arbor extending along the first beam and rotatable about a first axis;

a second arbor extending along the second beam and rotatable about a second axis that is parallel to the first axis;

at least one first slitter head on the first beam;

at least one second slitter head on the second beam;

each slitter head comprising:

a housing that is movable along the beam on which the slitter head is located;

a hub that rotates in the housing and through which extends the arbor for the beam on which the slitter head is located, the hub being engaged with the arbor to rotate with the arbor, but being movable axially along the arbor, a knife carried by the hub;

at least one fluid-operated device on the housing;

a first hose assembly carried by the first beam for directing pressurized fluid to the fluid-operated device on the first slitter head; and a second hose assembly carried by the second beam for directing pressurized fluid to the fluid-operated device on the second slitter head;

each hose assembly including:

an entry block mounted in a fixed position with respect to the beam that carries the hose assembly;

a terminal block carried by the slitter head on the beam that carries the hose assembly;

a flexible hose extending between the entry block and the terminal block for the slitter head, the hose extending from the entry block away from the slitter head and then toward the slitter head and forming a loop where it changes direction; and a hose carrier at the loop in each hose, the hose carrier being urged away from the entry and terminal blocks to maintain the hose taut.

16. A machine according to claim 15 and further comprising:

first lock rods extending along the first beam and being fixed in position with respect to the first beam;

second lock rods extending along the second beam and being fixed in position with respect to the second beam;

and wherein the fluid-operated device for each slitter head further includes:

clamps located on the housing and being capable of clamping against the lock rods for the beam along which slitter head extends, such that the slitter head is held in a fixed position with respect the beam and the knife is held in a fixed axial position on the arbor.

17. A machine accordingly to claim 16 and further comprising:

a first threaded shaft extending along the first beam and being fixed in position with respect to the first beam;

a second threaded shaft extending along the second beam and being fixed in position with respect to the second beam;

and wherein the fluid-operated device on each slitter head further includes a nut that engages the threaded shaft on the beam on which the slitter head is located and a hydraulic motor that rotates the nut.

18. A machine according to claim 15 wherein a hose that extends between the entry block and the terminal block for each slitter head contains an electrical wire.

* * * * *